United States Patent
Kubota

(10) Patent No.: US 9,020,551 B2
(45) Date of Patent: Apr. 28, 2015

(54) COMMUNICATION APPARATUS AND COMMUNICATION METHOD

(71) Applicant: Syuji Kubota, Tokyo (JP)

(72) Inventor: Syuji Kubota, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 347 days.

(21) Appl. No.: 13/721,302

(22) Filed: Dec. 20, 2012

(65) Prior Publication Data

US 2013/0172034 A1    Jul. 4, 2013

(30) Foreign Application Priority Data

Dec. 28, 2011 (JP) ................................ 2011-289904
Nov. 22, 2012 (JP) ................................ 2012-256835

(51) Int. Cl.
| | |
|---|---|
| H04N 7/173 | (2011.01) |
| H04N 7/06 | (2006.01) |
| H04N 21/41 | (2011.01) |
| H04B 15/00 | (2006.01) |
| H04W 72/04 | (2009.01) |
| H04W 16/10 | (2009.01) |
| H04N 9/31 | (2006.01) |
| H04W 84/10 | (2009.01) |

(52) U.S. Cl.
CPC .............. *H04B 15/00* (2013.01); *H04W 72/04* (2013.01); *H04W 16/10* (2013.01); *H04W 84/10* (2013.01)

(58) Field of Classification Search
CPC ............ H04N 21/4122; H04N 9/3147; H04N 21/4113; H04N 7/06; H04N 7/063; H04N 7/066
USPC .......................................................... 455/509
See application file for complete search history.

(56) References Cited

U.S. PATENT DOCUMENTS

| | | | | |
|---|---|---|---|---|
| 7,164,933 | B1 * | 1/2007 | Steigerwald et al. ....... | 455/562.1 |
| 2003/0215780 | A1 * | 11/2003 | Saar et al. ..................... | 434/351 |
| 2006/0132492 | A1 * | 6/2006 | Cantin ........................... | 345/519 |
| 2006/0268760 | A1 * | 11/2006 | Fang et al. .................... | 370/328 |
| 2009/0021646 | A1 * | 1/2009 | Shao et al. .................... | 348/608 |
| 2009/0073393 | A1 * | 3/2009 | Lee et al. ......................... | 353/94 |
| 2009/0096939 | A1 * | 4/2009 | Nomizo ........................... | 348/744 |
| 2011/0229106 | A1 * | 9/2011 | Cho ................................ | 386/219 |
| 2013/0095874 | A1 * | 4/2013 | Moshfeghi ..................... | 455/509 |
| 2014/0078399 | A1 * | 3/2014 | Frouin et al. .................. | 348/516 |

FOREIGN PATENT DOCUMENTS

| | | |
|---|---|---|
| JP | 2004-348440 | 12/2004 |
| JP | 2006-284990 | 10/2006 |

* cited by examiner

*Primary Examiner* — Wesley Kim
*Assistant Examiner* — Devan Sandiford
(74) *Attorney, Agent, or Firm* — Oblon, McClelland, Maier & Neustadt, L.L.P.

(57) ABSTRACT

A communication apparatus for performing communication of a plurality of pieces of data includes a plurality of communication units configured to perform communication at frequencies different from each other; and a selection unit configured to select a physical position of electromagnetic wave radiation for each of the communication units, and switch the physical position to be selected to another one of the physical positions of the communication units at predetermined intervals.

7 Claims, 11 Drawing Sheets

FIG.7
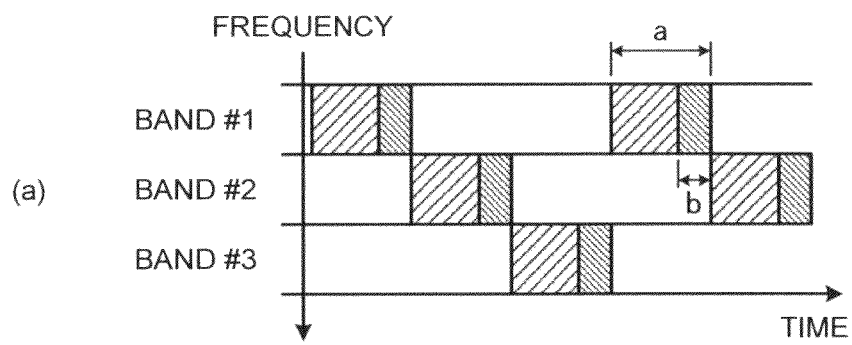
(a)
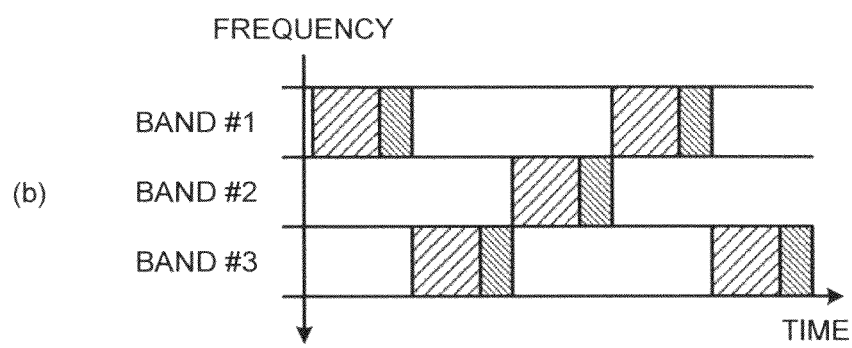
(b)

|  | PT#1 | PT#2 | PT#3 |
|---|---|---|---|
| TX#1 | CH#1 | CH#2 | CH#3 |
| TX#2 | CH#2 | CH#3 | CH#1 |
| TX#3 | CH#3 | CH#1 | CH#2 |

FIG.14

|       | PT#1' | PT#2' | PT#3' |
|-------|-------|-------|-------|
| TX#1' | AN#1  | AN#2  | AN#3  |
| TX#2' | AN#2  | AN#3  | AN#1  |
| TX#3' | AN#3  | AN#1  | AN#2  |

COMMUNICATION APPARATUS AND COMMUNICATION METHOD

CROSS-REFERENCE TO RELATED APPLICATIONS

The present application claims priority to and incorporates by reference the entire contents of Japanese Patent Application No. 2011-289904 filed in Japan on Dec. 28, 2011 and Japanese Patent Application No. 2012-256835 filed in Japan on Nov. 22, 2012.

BACKGROUND OF THE INVENTION

1. Field of the Invention

The present invention relates to a communication apparatus and a communication method thereof.

2. Description of the Related Art

As is conventionally done in places such as conference rooms, screen information of an information terminal such as a personal computer (PC) is projected on a screen by using a projector, and thereby, information is shared among participants present. In many cases, the information terminal is connected by wire to the projector. In those cases, the information terminal is connected by a cable to an image input/output terminal (such as a digital visual interface (DVI) terminal) provided on the projector, and images are projected on the screen while the information terminal is operated in a position within reach of the cable.

When projectors are used in conferences or the like in comparatively spacious places, there are increasing cases in which a plurality of projectors are used and the conference is conducted with more pieces of information displayed by displaying different pieces of information with these projectors. There are also increasing cases in which a video conference system or the like uses screen projection with realistic sensation, for example, by using three large screens. In these cases, three projectors need to be prepared. For example, a horizontally long video image is divided into three video images, which in turn are projected by using the three projectors onto the three screens arranged adjacent to each other.

In the case of displaying video images different from each other with a plurality of projectors, it is conceivable to make the projectors project a plurality of pieces of screen information provided from a plurality of video image transmission sources (such as PCs). It is also conceivable to display the screen information provided from one PC with the three projectors. For example, three display connection ports are provided on the PC, and the three pieces of screen information are output from the three corresponding display connection ports.

In addition, the communication speed of wireless communication has increased in recent years, and it is already known that techniques to achieve wireless connections between projectors and information terminals are in practical use.

Japanese Patent Application Laid-open No. 2006-284990 discloses an image transmission multi-display system in which image data is divided in accordance with positions of a plurality of projectors, and each divided piece of image data positional information is associated with identification information of each of the projectors, so that image data to be sent is sent only to the projector corresponding thereto via a network. According to Japanese Patent Application Laid-open No. 2006-284990, an image divided into a plurality of pieces and sent by wireless transmission can be synthesized on a large screen by using a plurality of projectors.

In conventional methods of wireless connection, a wireless transmitter and a receiver have a one-to-one relation with each other. Therefore, in the case in which the different pieces of information are sent from one PC to three projectors, the information needs to be sent in a serial manner to the three projectors. In this case, the transmission capacity to each of the three projectors is one third of a transmission capacity of the transmission from the PC. Supposing that the PC sends the video data at a transmission rate of 30 frames per second (fps), the transmission rate for each one of the projectors is 10 fps, and thus, it is difficult to send an animation video image.

It is accordingly conceivable to send the video image using a plurality of channels that can transmit data independently from each other. For example, three of such channels are simultaneously used, and each of the channels sends the video data in parallel with each other. In this case, each of the three projectors is assigned with each one of the channels, and thereby, the transmission rate of 30 fps can be ensured for each of the projectors, thus making it possible to deal with the animation video image.

However, even when a plurality of channels are used, there are cases in which transmission channels between some of the projectors and the video image transmission source have a bad quality. For example, the quality of the transmission channels can deteriorate due to various factors such as that the distance between the video image transmission source (PC) and one of the projectors is long, that one of the projectors is in over-the-horizon communication for the video image transmission source, and that multipath fading occurs.

Therefore, there is a need for a communication apparatus and a communication method that suppress degradation in quality of communication in a particular receiver when the communication is performed from the communication apparatus to a plurality of receivers.

SUMMARY OF THE INVENTION

It is an object of the present invention to at least partially solve the problems in the conventional technology.

According to an embodiment, there is provided a communication apparatus for performing communication of a plurality of pieces of data. The communication apparatus includes a plurality of communication units configured to perform communication at frequencies different from each other; and a selection unit configured to select a physical position of electromagnetic wave radiation for each of the communication units, and switch the physical position to be selected to another one of the physical positions of the communication units at predetermined intervals.

According to another embodiment, there is provided a communication method for performing communication of a plurality of pieces of data. The communication method includes performing a plurality of communications at frequencies different from each other; selecting a physical position of electromagnetic wave radiation for each of the communications; and switching the physical position to be selected to another one of the physical positions of the communications at predetermined intervals.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 illustrates sequences of frequency hopping defined by the WiMedia system;

FIG. 14 is a schematic diagram illustrating a configuration of an example of a selection control table according to the third embodiment.

DETAILED DESCRIPTION OF THE PREFERRED EMBODIMENTS

Embodiments of a communication apparatus and a communication method will be described below in detail with reference to the accompanying drawings.

First Embodiment

Figure 1:
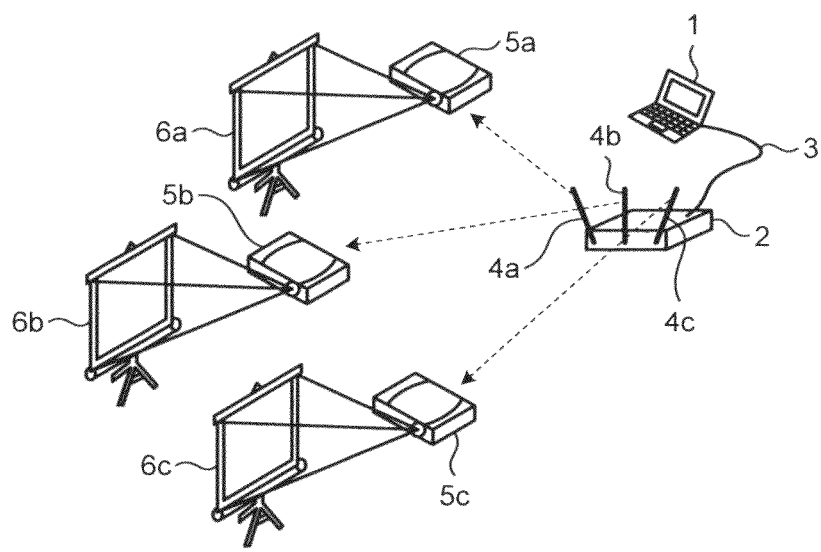
FIG. 1 is a schematic diagram schematically illustrating a configuration of an example of a multiscreen projection system applicable to a first embodiment.

FIG. 1 schematically illustrates a configuration of an example of a multiscreen projection system applicable to a first embodiment of the present invention. The multiscreen projection system illustrated in FIG. 1 is configured to simultaneously send, by wireless communication, three different video images output from one information terminal 1 (such as a personal computer) serving as a video image transmission source to three projectors 5a, 5b, and 5c so as to make the projectors 5a, 5b, and 5c display the images on screens 6a, 6b, and 6c, respectively.

Figure 2:
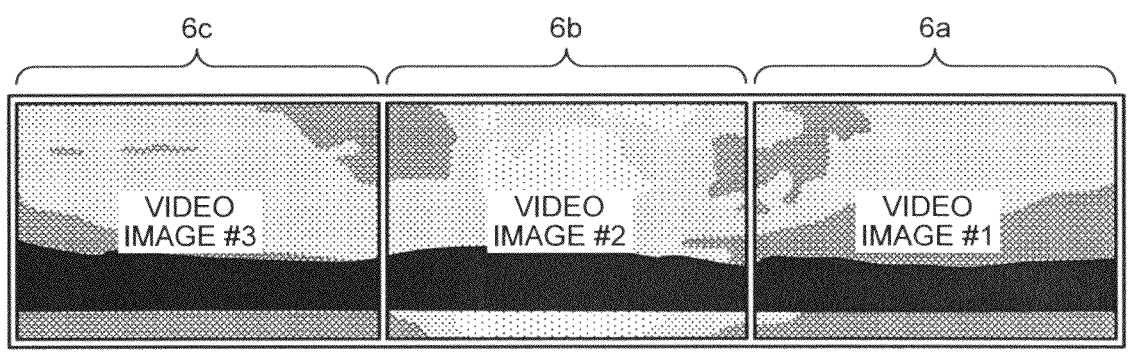
FIG. 2 is a schematic diagram illustrating an example of images each displayed on each screen.

FIG. 2 illustrates an example of images displayed on the screens 6a, 6b, and 6c. For example, a video image #1, a video image #2, and a video image #3 obtained by dividing a single screen into three parts are displayed on the screens 6a, 6b, and 6c, respectively. Placing the screens 6a, 6b, and 6c in appropriate positions can constitute the original single screen by the three divided video images #1, #2, and #3, respectively, and thus can display more pieces of information.

In FIG. 1, the information terminal 1 is assumed to be capable of outputting, for example, a screen (assumed to be a main screen) to be displayed on a display included in the information terminal 1 and a screen (assumed to be a virtual screen) internally generated by the information terminal 1. The virtual screen is assumed to be capable of outputting two screens, that is, a first virtual screen and a second virtual screen. Pieces of screen information of the main screen and of the first and the second virtual screens are updated, for example, at units of 30 and 60 frames per second, respectively.

A piece of video data for displaying the main screen is output from a display port provided on the information terminal 1. Pieces of video data for displaying the first and the second virtual screens are output, for example, from a display port provided on a graphics adapter connected via an interface such as a universal serial bus (USB). Not limited to this example, if the information terminal 1 is provided with a plurality of display ports, the video data for the main screen and the video data for at least one of the first and the second virtual screens can be output from the display ports provided on the information terminal 1.

In the following description, the piece of video data for displaying the main screen will be called video data #1, and the pieces of video data for displaying the first and the second virtual screens are called video data #2 and video data #3, respectively, as appropriate.

The information terminal 1 and a communication apparatus 2 are connected to each other by cables 3. The cables 3 transfer the image data output from the information terminal 1 to the communication apparatus 2. While the cables 3 are illustrated as a single line in FIG. 1, the same number of the cables 3 as the number of the screens to be displayed are actually connected. In the present example in which the three screens including the main screen and the first and the second virtual screens are displayed, the connection is provided by three of the cables 3.

The communication apparatus 2 is provided with a plurality of transmitters and a plurality of antennae 4a, 4b, and 4c corresponding to the respective transmitters, and can simultaneously perform transmission at different frequencies or through different frequency bands (channels) for the antennae 4a, 4b, and 4c. Although details will be described later, the communication apparatus 2 can switch the transmit frequency of signals sent by each of the antennae 4a, 4b, and 4c at predetermined intervals of time.

The projectors 5a, 5b, and 5c receive signals sent from the communication apparatus 2, and project video images to the screens 6a, 6b, and 6c, respectively. Here, each of the projectors 5a, 5b, and 5c is assumed to be capable of setting the frequency or the frequency band (hereinafter abbreviated as frequency as appropriate) at which the receiving is performed. Specifically, each of the projectors 5a, 5b, and 5c can selectively receive a signal having a corresponding frequency among a plurality of signals having frequencies different from each other that are sent from the communication apparatus 2.

Figure 3:
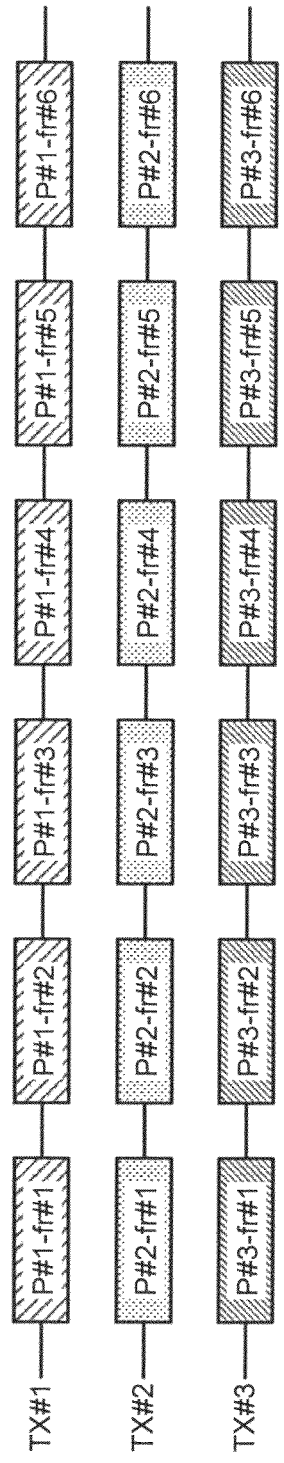
FIG. 3 is a schematic diagram illustrating an example of a communication method used by the multiscreen projection system in the case of not applying the first embodiment.
Figure 4:
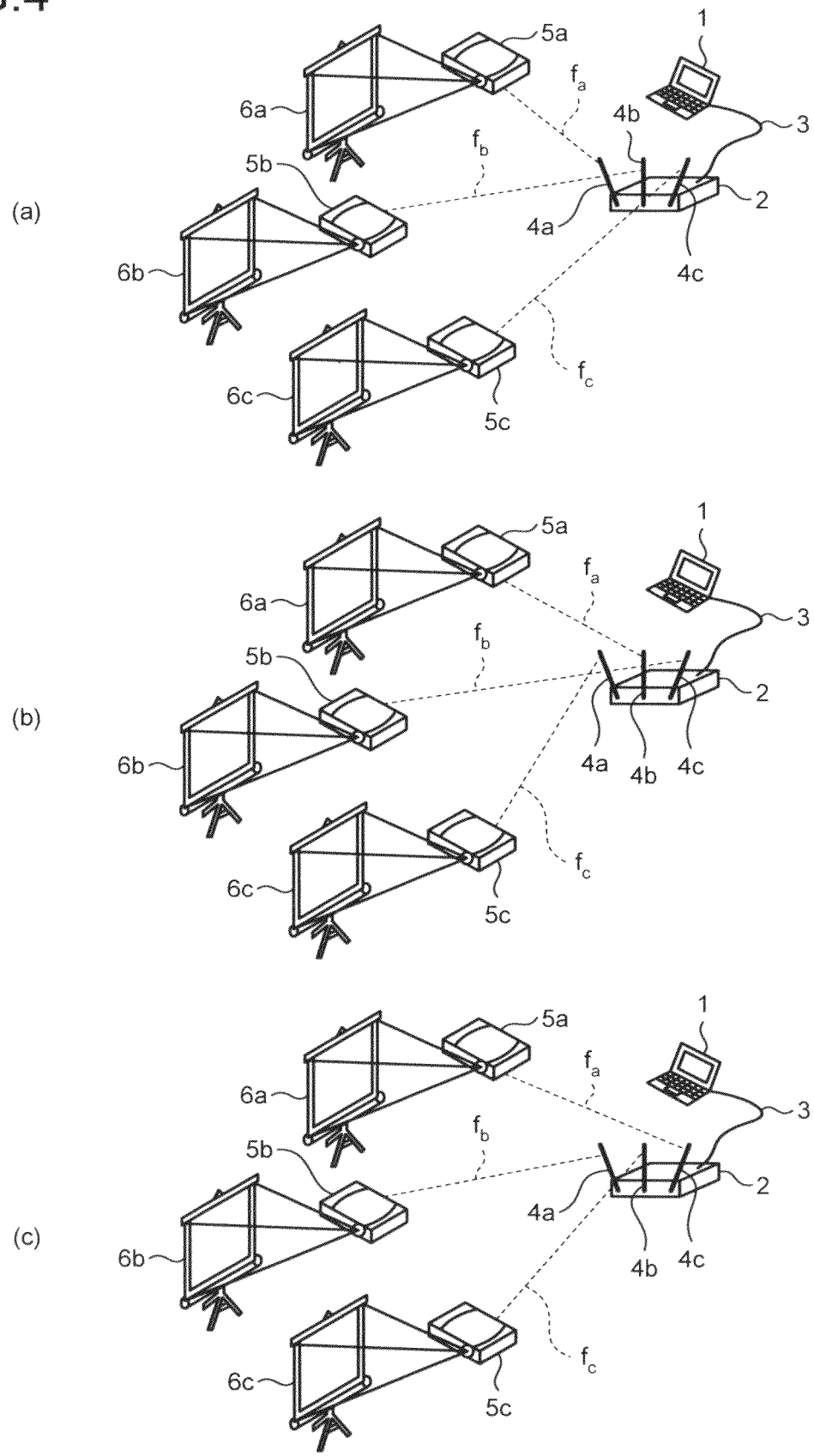
FIG. 4 schematically illustrates an example of a communication method used by the multiscreen projection system in the case of applying the first embodiment.
Figure 5:
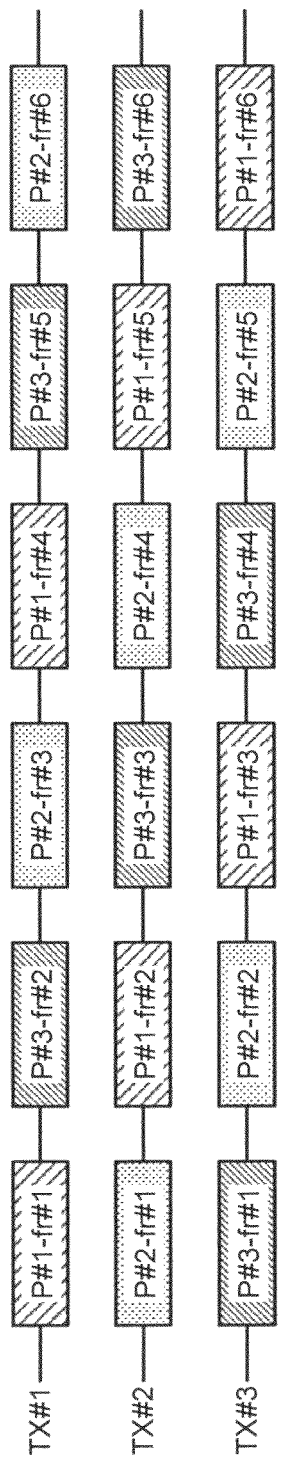
FIG. 5 is a schematic diagram more specifically illustrating the example of the communication method used by the multiscreen projection system in the case of applying the first embodiment.

A communication method according to the first embodiment will be schematically described using FIGS. 3 to 5. Note that, in FIGS. 3 and 5, the transmitters sending the signals from the antennae 4a, 4b, and 4c of the communication apparatus 2 are denoted as transmitters TX#1, TX#2, and TX#3, respectively; the projectors 5a, 5b, and 5c are denoted as projectors P#1, P#2, and P#3, respectively; and a symbol "fr#n" represents a frame of a video image.

The video data #1, #2, and #3 for three screens output from the information terminal 1 are sent to the three projectors 5a, 5b, and 5c, respectively, by the three transmitters TX#1, TX#2, and TX#3, respectively, included in the communication apparatus 2. Here, the three transmitters TX#1, TX#2, and TX#3 use frequencies different from each other, and thus use three frequencies in total. As a result, the transmission capacity for each of the three projectors 5a, 5b, and 5c can be ensured to be the same as a transmission capacity obtained when the information terminal 1 and one of the projectors communicate with each other on a one-to-one basis. Performing the communication using a plurality of frequencies is effective because video information requires a large transmission quantity per unit time.

FIG. 3 illustrates an example of a communication method used by the multiscreen projection system in the case of not applying the first embodiment. When the first embodiment is not applied, each of the transmitters TX#1, TX#2, and TX#3 has a fixed transmit frequency. In the example of FIG. 3, the video data is transmitted from the transmitter TX#1 to the projector 5a (P#1), from the transmitter TX#2 to the projector 5b (P#2), and from the transmitter TX#3 to the projector 5c (P#3). Thus, the transmission is performed between each fixed pair of the transmitter side and the receiver side.

In this case, the transmission channels between the transmitters TX#1 to TX#3 and the projectors P#1 to P#3, respectively, are fixed, and have each a fixed error rate (quality). Accordingly, if, for example, one of the transmission channels has a lower quality than that of the other transmission channels, the projector that receives signals via the lower quality transmission channel is fixed, and thus, the video image projected by the projector continues to be more degraded in image quality than video images projected by the other projectors.

FIG. 4 schematically illustrates an example of the communication method used by the multiscreen projection system in the case of applying the first embodiment. Here, each of the projectors 5a, 5b, and 5c is assumed to be set so as to receive a signal of each of frequencies $f_a$, $f_b$, and $f_c$, respectively.

For example, at a first time point, as illustrated in (a) of FIG. 4, the transmitter TX#1 sends the video data #1 as the signal of the frequency $f_a$ from the antenna 4a; the transmitter TX#2 sends the video data #2 as the signal of the frequency $f_b$ from the antenna 4b; and the transmitter TX#3 sends the video data #3 as the signal of the frequency $f_c$ from the antenna 4c.

Note that, when the term "frequency" is used as a "frequency band", the expression "frequency $f_c$" refers to a "frequency band having a center frequency at the frequency $f_c$ and having a predetermined bandwidth".

At a subsequent second time point, the frequency of the signal sent from each of the transmitters TX#1 to TX#3 is switched in synchronization with the video image sent as the signal. Specifically, as illustrated in (b) of FIG. 4, the transmitter TX#1 sends the video data #3 as the signal of the frequency $f_c$ from the antenna 4a; the transmitter TX#2 sends the video data #1 as the signal of the frequency $f_a$ from the antenna 4b; and the transmitter TX#3 sends the video data #2 as the signal of the frequency $f_b$ from the antenna 4c.

At a subsequent third time point, the frequency of the signal sent from each of the transmitters TX#1 to TX#3 is further switched in synchronization with the video image sent as the signal. Specifically, as illustrated in (c) of FIG. 4, the transmitter TX#1 sends the video data #2 as the signal of the frequency $f_b$ from the antenna 4a; the transmitter TX#2 sends the video data #3 as the signal of the frequency $f_c$ from the antenna 4b; and the transmitter TX#3 sends the video data #1 as the signal of the frequency $f_a$ from the antenna 4c.

At any of the above-described time points of FIG. 4, the signal of the frequency $f_a$ is selectively received by the projector 5a; the signal of the frequency $f_b$ is selectively received by the projector 5b; and the signal of the frequency $f_c$ is selectively received by the projector 5c. Therefore, the projector 5a always receives the video data #1. In the same manner, the projectors 5b and 5c always receive the video data #2 and #3, respectively.

In this manner, the frequencies of the signals sent from the transmitters TX#1 to TX#3 are switched at the predetermined intervals of time. The video data #1 to #3 sent from the transmitters TX#1 to TX#3, respectively, are switched in synchronization with the frequencies of the thus sent signals so that the continuous video data #1 to #3 are always sent to the projectors 5a to 5c, respectively.

FIG. 5 more specifically illustrates the example of the communication method used by the multiscreen projection system in the case of applying the first embodiment. As described above, in the first embodiment, the destinations of transmission from the transmitters TX#1, TX#2, and TX#3 are switched at the predetermined intervals of time. In synchronization with the switching of the destinations of transmission, the pieces of data sent from the transmitters TX#1, TX#2, and TX#3 are switched so that each of the projectors 5a, 5b, and 5c receives the corresponding piece of the data.

In the example of FIG. 5, the destinations of transmission from the transmitters TX#1, TX#2, and TX#3 are switched in synchronization with frame timing of the video data.

In this case, in the example of FIG. 5, at a first frame (fr#1), the transmitter TX#1 sends the video data #1 to the projector 5a (P#1) at the frequency $f_a$; the transmitter TX#2 sends the video data #2 to the projector 5b (P#2) at the frequency $f_b$; and the transmitter TX#3 sends the video data #3 to the projector 5c (P#3) at the frequency $f_c$.

Next, at a second frame (fr#2), the transmit frequencies are switched to change the destinations of transmission from the transmitters TX#1, TX#2, and TX#3. In addition, the input sources of the video data to the transmitters TX#1, TX#2, and TX#3 are also switched in synchronization with the switching of the transmit frequencies so that the continuous video data is sent to the same destination of transmission.

Specifically, the transmitter TX#1 sends the video data #3 to the projector P#3 at the frequency $f_b$; the transmitter TX#2 sends the video data #1 to the projector P#1 at the frequency $f_a$; and the transmitter TX#3 sends the video data #2 to the projector P#2 at the frequency $f_b$.

In the same manner, also at a subsequent third frame (fr#3), the transmit frequencies of the transmitters TX#1, TX#2, and TX#3 are switched, and the input sources of the video data to the transmitters TX#1, TX#2, and TX#3 are switched as well.

Specifically, the transmitter TX#1 sends the video data #2 to the projector P#2 at the frequency $f_b$; the transmitter TX#2 sends the video data #3 to the projector P#3 at the frequency $f_c$; and the transmitter TX#3 sends the video data #1 to the projector P#1 at the frequency $f_a$.

The switching of the destinations of transmission is synchronized with the frame timing of the video frames. Therefore, the projectors 5a, 5b, and 5c need only to repeat the normal receiving operation at times synchronized with the frame timing, without regard to which of the signals sent from the transmitters TX#1, TX#2, and TX#3 is received. The projectors 5a, 5b, and 5c do not change the receive frequency channels either.

In this manner, according to the first embodiment, the transmission is performed while the pairs between the transmitters TX#1 to TX#3 and the projectors 5a to 5c are switched, and thus, the transmission channels to the projectors 5a to 5c are changed at the predetermined intervals. As a result, physical positions of antenna radiation can be moved, and thus, propagation paths of electromagnetic waves can be changed. Accordingly, even if the transmission channels between the transmitters TX#1 to TX#3 and the projectors 5a to 5c include a low-quality transmission channel, degradation of image quality is less noticeable because signals transmitted via the transmission channels are not received by a fixed projector.

Although the description above has explained that the three pieces of video data are sent from the three transmitters TX#1 to TX#3 to the three projectors 5a to 5c, the present embodiment is not limited to this example. In other words, four or more of such projectors and such pieces of video data may be used, or two pieces of such video data may be sent from two of such transmitters to two of such projectors. In addition, more than one video image projected with more than one projectors are not limited to those obtained by dividing one video image into three parts, but may be video images having contents different from each other.

Second Embodiment

Next, a second embodiment of the present invention will be described. The second embodiment is an example in which a WiMedia UWB communication system is used as the communication system in the first embodiment described above. WiMedia UWB is a set of communication specifications promoted by the WiMedia Alliance for ultra-wideband (UWB) wireless system serving as one of the wireless communication systems, and is one of the technologies to wirelessly connect between devices located within a radius of several meters. A frequency band of 3.1 GHz to 10.6 GHz is defined in the WiMedia UWB specifications. The WiMedia UWB communication system is hereinafter abbreviated as WiMedia system.

Figure 6:
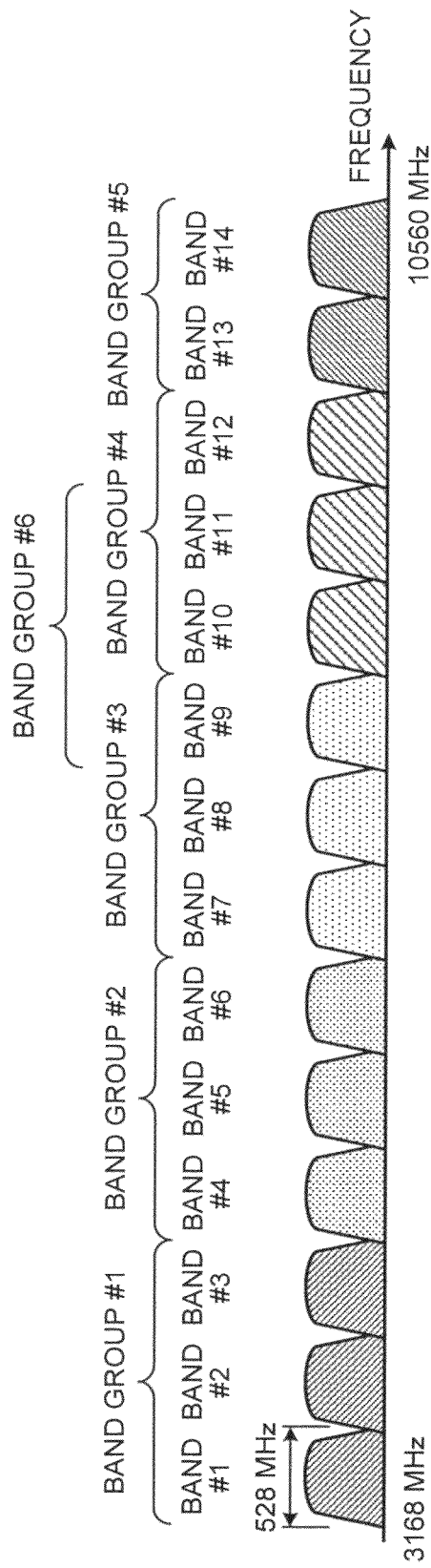
FIG. 6 is a schematic diagram for explaining a communication system using a WiMedia system.

The communication system using the WiMedia system will be schematically described using FIG. 6. In the WiMedia system, as illustrated in FIG. 6, a range of 3.168 GHz (3168 MHz) to 10.56 GHz (10560 MHz) out of the frequency band of 3.1 GHz to 10.6 GHz is divided into 14 bands #1 to #14 having a bandwidth of 528 MHz per band, and three of the bands, #n to #(n+2), having frequency ranges adjacent to each other form one band group. Note that the band group #5 on the highest frequency side is formed by two bands. The communication can be performed by using the three bands in the band group while changing the band (center frequency) along time series by frequency hopping.

FIG. 7 illustrates sequences of the frequency hopping defined by the WiMedia system. Illustrated in (a) of FIG. 7 is a method of hopping, in a sequential and cyclical manner, from a band having a lower band number (lower center frequency) to a band having a higher band number (higher center frequency) in the band group. Illustrated in (b) of FIG. 7 is a method in which, contrary to the method illustrated in (a) of FIG. 7, the hopping is performed from a band having a higher band number to a band having a lower band number in a sequential and cyclical manner. These hopping methods illustrated in (a) and (b) of FIG. 7 are distinguished by a distinguisher time frequency code (TFC).

In the WiMedia system, multi band-orthogonal frequency division multiplexing (MB-OFDM) can be used as a modulation method. For example, a range a exemplified in (a) of FIG. 7 represents an OFDM symbol, and a range b is a zero-padded portion. The range b is used as a guard time in effect.

Each available band among the bands #1 to #14 is specified in individual regions in the world. In the band groups defined so that no bands overlap each other, there is no common band that can be used globally. Therefore, a band group represented as a band group #6 in FIG. 6 is defined as a band group some bands of which overlap with the band group #3 and some other bands of which overlap with the band group #4.

Figure 8:
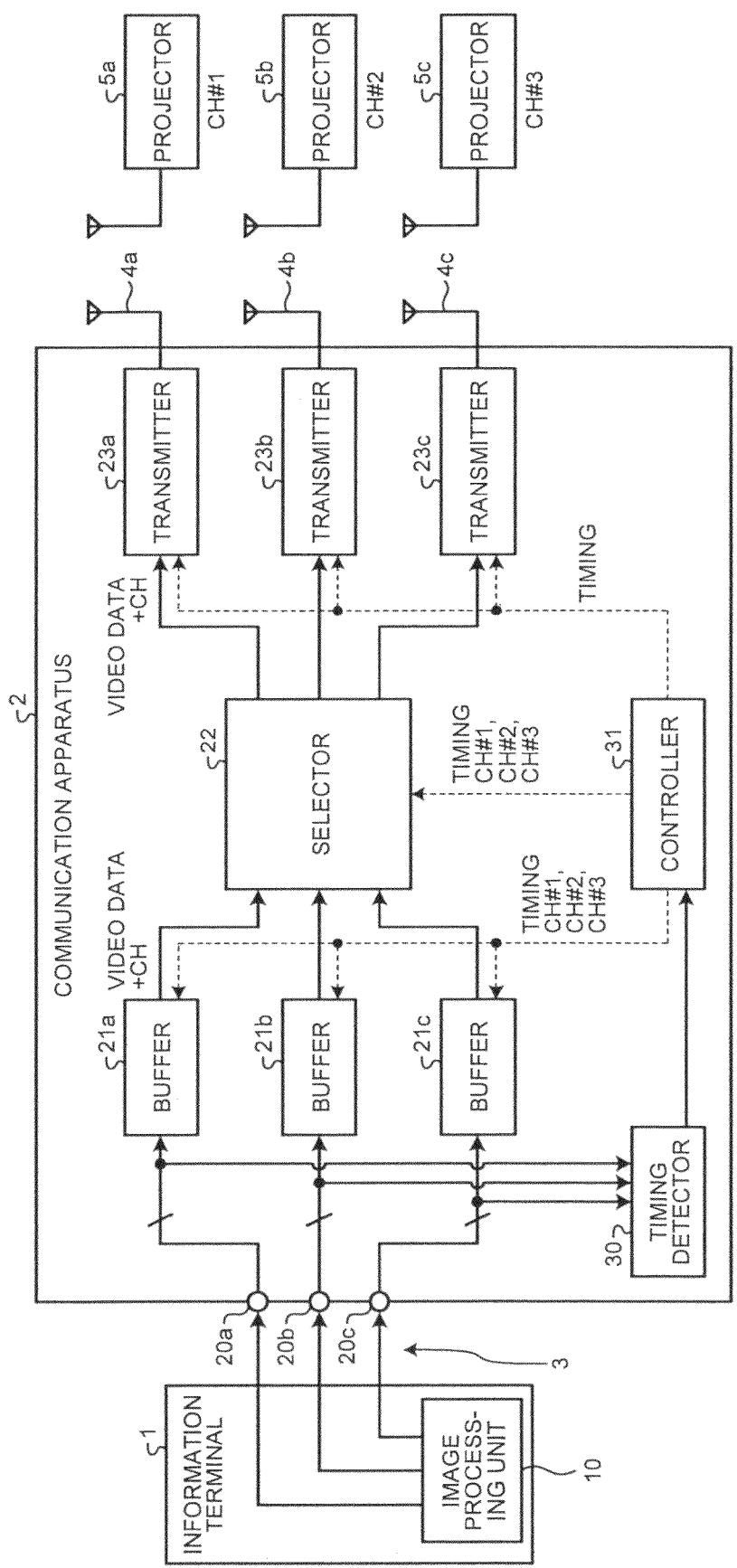
FIG. 8 is a block diagram illustrating a configuration of an example of a communication apparatus applicable to a second embodiment.

FIG. 8 illustrates a configuration of an example of a communication apparatus 2 applicable to the second embodiment. Note that, in FIG. 8, the same numerals are given to the parts in common with those in FIG. 1 described above, and detailed description thereof will be omitted. The communication apparatus 2 is provided, for three respective channels, with input terminals 20a, 20b, and 20c, buffers 21a, 21b, and 21c, transmitters 23a, 23b, and 23c, and the antennae 4a, 4b, and 4c corresponding to the transmitters 23a, 23b, and 23c, respectively. The communication apparatus 2 is further provided with a selector 22, a timing detector 30, and a controller 31.

The information terminal 1 that is a personal computer is provided with an image processing unit 10, in which, for example, a main screen, a first virtual screen, and a second virtual screen are generated. Each of the generated screens is refreshed, for example, at a period equivalent to 60 Hz, and output as video data having a frame period equivalent to 60 Hz. In the following description, the pieces of video data for the main screen, the first virtual screen, and the second virtual screen are called video data #1, video data #2, and video data #3, respectively.

Each of the video data #1, #2, and #3 output from the image processing unit 10 is superimposed with a vertical synchronizing signal to serve as video data having, for example, a format conforming to the Digital Visual Interface (DVI) standard. Each of the video data #1, #2, and #3 having the DVI standard format is output from the information terminal 1 via a DVI cable and supplied to each of the input terminals 20a, 20b, and 20c of the communication apparatus 2.

In the communication apparatus 2, each of the video data #1, #2, and #3 supplied to the input terminals 20a, 20b, and 20c is temporarily stored in each of the buffers 21a, 21b, and 21c, respectively, which are each capable of storing video data, for example, for at least two frames.

The timing detector 30 extracts the vertical synchronizing signal from each of the video data #1, #2, and #3. In accordance with the timing at which the vertical synchronizing signal is extracted from each of the video data #1, #2, and #3, the timing detector 30 sends, to the controller 31, a timing signal indicating the frame timing of each of the video data #1, #2, and #3. For example, it is conceivable to send the timing signal based on a vertical synchronizing signal at the latest timing among the vertical synchronizing signals extracted from the video data #1, #2, and #3.

The controller 31 has, for example, a microprocessor, a read-only memory (ROM), and a random access memory (RAM), and, according to a program stored in advance in the ROM, the microprocessor operates using the RAM as a work memory, thus controlling the overall operation of the communication apparatus 2.

The controller 31 outputs, to the buffers 21a, 21b, and 21c, a readout control signal that instructs to read out data, and outputs a switching control signal to the selector 22. The controller 31 also outputs, to the transmitters 23a, 23b, and 23c, a transmission timing instruction signal that instructs the transmission timing. The readout control signal, the switching control signal, and the transmission timing instruction signal are output in synchronization with the timing signal received from the timing detector 30.

Upon receiving the timing signal from the timing detector 30, the controller 31 outputs the readout control signal to the buffers 21a, 21b, and 21c. According to this readout control signal, the video data #1, #2, and #3 for one frame are read out from the buffers 21a, 21b, and 21c. The video data #1, #2, and #3 read out from the buffers 21a, 21b, and 21c are supplied to the selector 22.

Moreover, the controller 31 sets, for each of the buffers 21a, 21b, and 21c, information indicating a transmission channel CH through which the video data read out is transmitted (hereinafter abbreviated as transmission channel CH information). Information indicating the frequency band of the transmission channel can be used as the transmission channel CH information. As an example, in the present example to which the WiMedia system is applied as the communication system, a band number can be used as the transmission channel CH information. Not limited to this example, the value of the center frequency of the transmission channel CH can be used as the transmission channel CH information.

Specifically, the controller 31 sets the information, in other words, as to which of the projectors 5a, 5b, and 5c is the destination to which each of the video data #1, #2, and #3 supplied to the input terminals 20a, 20b, and 20c of the communication apparatus 2 read out from the buffers 21a, 21b, and 21c, respectively, is to be sent. This matching between the video data and the transmission destinations may be performed in advance, for example, when the communication apparatus 2 is started, or may be performed in accordance with a user operation to an operating unit (not illustrated). For example, it is conceivable that the user sets the transmission destinations of the video data so that the video images are arranged in a desired order while viewing the video images actually projected on the screens 6a, 6b, and 6c.

Here, each of transmission channels CH#1, CH#2, and CH#3 is assumed to be set for each of the buffers 21a, 21b, and 21c. With this setting, each of the video data #1, #2, and #3 read out from each of the buffers 21a, 21b, and 21c is set to be sent to each of the projectors 5a, 5b, and 5c.

According to the readout control signal output from the controller 31, the video data #1, #2, and #3 are read out from the buffers 21a, 21b, and 21c, and supplied to the selector 22. At this time, each of the video data #1, #2, and #3 read out from each of the buffers 21a, 21b, and 21c is appended with the information indicating the transmission channel CH, and supplied to the selector 22.

According to the switching control signal supplied from the controller 31 and to the information indicating the transmission channel CH appended to each of the video data #1, #2, and #3, the selector 22 selects to which of the transmitters 23a, 23b, and 23c each of the video data #1, #2, and #3 supplied from each of the buffers 21a, 21b, and 21c is to be supplied. This selection is switched at predetermined intervals, such as at intervals of the frame timing.

Each of the video data #1, #2, and #3 output from the selector 22 is supplied together with the information indicating the transmission channel CH to each of the transmitters 23a, 23b, and 23c that is selected in the selector 22.

The transmitters 23a, 23b, and 23c perform transmission processing of the video data #1, #2, and #3 supplied from the selector 22, according to the transmission timing instruction signal output from the controller 31. Specifically, the transmitters 23a, 23b, and 23c apply predetermined signal processing (to be described later) to the video data #1, #2, and #3 supplied from the selector 22, and modulate the processed video data #1, #2, and #3. Then, each of the transmitters 23a, 23b, and 23c converts the modulation signal into a transmission signal having a frequency based on the transmission channel CH information appended to each of the video data #1, #2, and #3, and supplies the transmission signal to the corresponding one of the antennae 4a, 4b, and 4c. The antennae 4a, 4b, and 4c convert the supplied transmission signals into electromagnetic waves and emit them, thus sending the transmission signals.

Each of the transmitters 23a, 23b, and 23c can perform transmission by selecting any one of the channels CH#1, CH#2, and CH#3 that have frequencies or frequency bands different from each other. For example, each of the channels CH#1, CH#2, and CH#3 can be assigned with each of the three bands in one of the band groups in the WiMedia system. More specifically, if the band group #6 is used, it is conceivable to assign, for example, the channel CH #1 with the band #9, the channel CH#2 with the band #10, and the channel CH#3 with the band #11.

According to the transmission channel CH information appended to the video data #1, one of the channels CH#1, CH#2, and CH#3 is set as the transmission channel for the transmitter 23a. In the same manner, one and another of the channels CH#1, CH#2, and CH#3 are set as the transmission channels for the transmitters 23b and 23c, according to the transmission channel CH information appended to the video data #2 and #3, respectively. Note that the channels set for the transmitters 23a, 23b, and 23c differ from each other.

The receiving channels for the projectors 5a, 5b, and 5c are fixed to the channels CH#1, CH#2, and CH#3, respectively. For example, if the transmission from the transmitters 23a, 23b, and 23c is performed using the channels CH#1, CH#2, and CH#3, respectively, according to the selection by the selector 22 in the communication apparatus 2, the signal sent from the transmitter 23a is received by the projector 5a; the signal sent from the transmitter 23b is received by the projector 5b; and the signal sent from the transmitter 23c is received by the projector 5c.

The projectors 5a, 5b, and 5c and the corresponding screens 6a, 6b, and 6c are preferably installed so that the three video image #1, #2, and #3 projected on the screens 6a, 6b, and 6c are appropriately related to each other.

Figure 9:
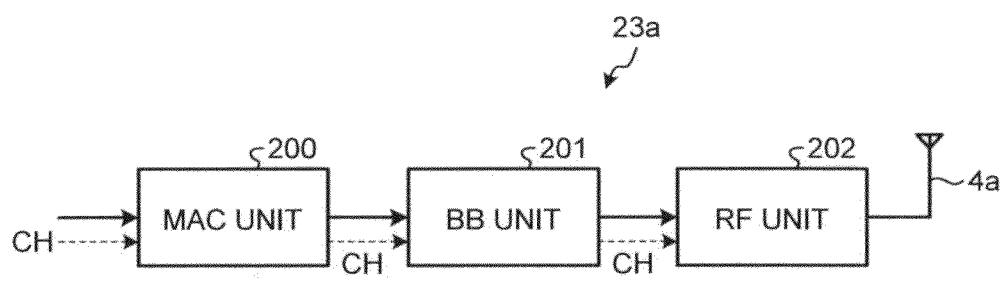
FIG. 9 is a block diagram illustrating a configuration of an example of a transmitter according to the second embodiment.

FIG. 9 illustrates a configuration of an example of the transmitters 23a, 23b, and 23c. Note that FIG. 9 illustrates the transmitter 23a as a typifying example because the transmitters 23a, 23b, and 23c are workable in a common configuration. The transmitter 23a has a media access control (MAC) unit 200, a baseband unit (BB) 201, and an RF unit 202.

To the MAC unit 200, the video data #n output from the selector 22 is supplied in units of video frames, and the transmission channel CH information appended to the video data #n is supplied as well. The MAC unit 200 applies processing with respect to communications protocol to the supplied video frame of the video data #n, and generates transmission frames each serving as a transmission unit of data. For example, the MAC unit 200 divides one frame of the supplied video data #n into parts having a predetermined size, and appends headers thereto to generate the transmission frames.

The header appended to the transmission frame contains information, such as the following, on the data included in the transmission frame.
(1) Information that indicates whether the data is the first data of the video frame
(2) Frame number that indicates the position of the video frame to which the data belongs, in the video data #n
(3) Data length of the video frame to which the data belongs
(4) Information that indicates the position of the data in the video frame to which the data belongs The MAC unit 200 supplies the generated transmission frame together with a channel switching signal CH to the BB unit 201.

The BB unit 201 applies scramble processing to the transmission frame supplied as digital data from the MAC unit 200 to reduce the temporal bias in the ratio between "ones" and "zeros" in the data, and further applies error correction coding processing to generate an error-correcting code. The generated error-correcting code is further stored in the transmission frame. The BB unit 201 applies error detection coding processing to the data in the transmission frame, for example, using a cyclic redundancy check (CRC) method. The error-detection code generated by the error detection coding processing is appended to the transmission frame.

The BB unit 201 outputs, to the RF unit 202, the transmission frame that has been subjected to the predetermined digital processing and appended with the error-checking code as described above, together with the transmission channel CH information.

Figure 10:
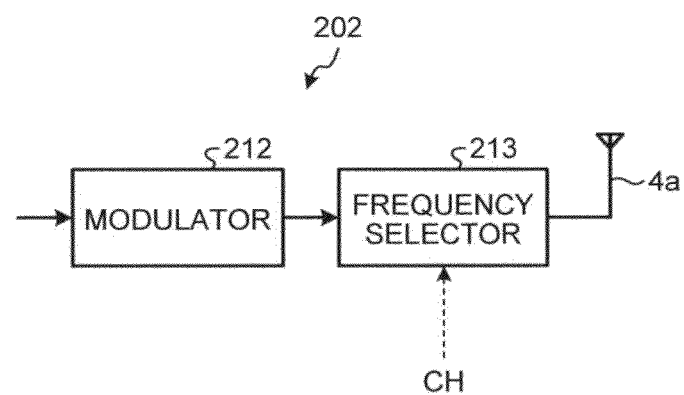
FIG. 10 is a block diagram illustrating a configuration of an example of an RF unit according to the second embodiment.

FIG. 10 illustrates a configuration of an example of the RF unit 202. As exemplified in FIG. 10, the RF unit 202 has a modulator 212 and a frequency selector 213. The transmission frame that has been appended with the error-detection code and supplied from the BB unit 201 is subjected, in the modulator 212, to the predetermined signal processing and is then modulated using the OFDM technique. The modulation signal obtained by modulating the transmission frame appended with the error-detection code is supplied to the frequency selector 213.

The frequency selector 213 is also supplied with the channel switching signal CH output from the BB unit 201. The frequency selector 213 converts the modulation signal supplied from the modulator 212 into the transmission signal having the frequency corresponding to the transmission channel indicated in the transmission channel CH information. The converted transmission signal having the frequency corresponding to the transmission channel is converted into the electromagnetic wave and transmitted by the antenna 4a.

Figures 11, 12:
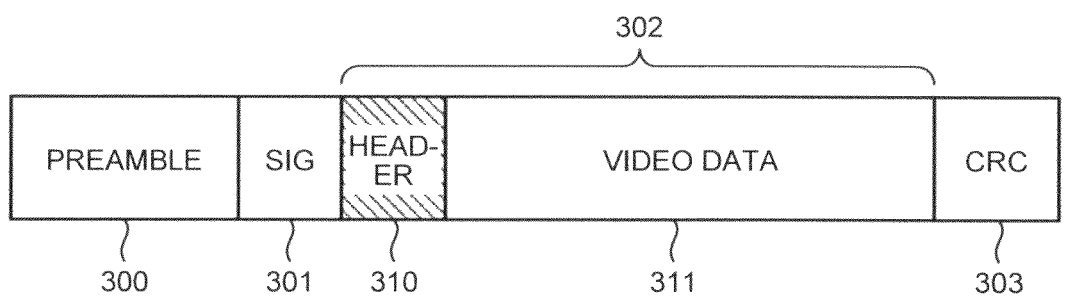
FIG. 11 is a schematic diagram schematically illustrating a configuration of an example of a wireless packet applicable to the second embodiment.
FIG. 12 is schematic diagram illustrating a configuration of an example of a selection control table according to the second embodiment.

In the second embodiment, the data transmission by wireless communication using electromagnetic waves is performed in units of packets. FIG. 11 schematically illustrates a configuration of an example of a wireless packet applicable to the second embodiment. The wireless packet contains, for example, from the head, a preamble 300, a SIG 301, a data field 302, and a CRC 303.

The preamble 300 is a bit sequence of a synchronizing signal appended to the head of the wireless packet. The preamble 300 defines two types of length and is appended to the physical layer (such as in the modulator 212). The SIG 301 is a signal field containing information such as a modulation method (transmission rate) and a data length of data included in the data field 302 and is appended to the physical layer.

The data field 302 is a part storing the actual data, and includes a header 310 and video data 311. The video data 311 includes the above-described transmission frame. The header 310 includes the above-described header appended to the transmission frame, and also includes information indicating media access control (MAC) addresses of a destination, a transmission source, and access points. The CRC 303 stores the error-detection code for detecting transmission errors in the data stored in the data field 302.

Selection Processing in Selector

Here, the selection processing in the selector 22 will be described. As an example, in accordance with a selection control table stored in advance in the ROM or the like, the controller 31 generates the switching control signal and the channel switching signals CH corresponding to the transmitters 23a, 23b, 23c, and supplies the generated signals to the selector 22 and the transmitters 23a, 23b, and 23c, respectively.

FIG. 12 illustrates a configuration of an example of the selection control table. In FIG. 12, the transmitters TX#1, TX#2, and TX#3 represent the transmitters 23a, 23b, and 23c, respectively, and the channels CH#1, CH#2, and CH#3 represent the transmission channels selectable at the transmitters 23a, 23b, and 23c. The transmitters 23a, 23b, and 23c send signals using frequencies or frequency bands different from each other among the channels CH#1, CH#2, and CH#3.

In the selection control table, a plurality of patterns are defined as corresponding relations between each of the transmitters 23a, 23b, and 23c and each of the transmission channels CH#1, CH#2, and CH#3. These patterns can be defined, for example, in accordance with the sequence of the frequency hopping described using (a) and (b) of FIG. 7. In the example of FIG. 12, the order of the patterns is defined in accordance with the sequence, illustrated in (a) of FIG. 7, of hopping between the three bands in the band group in the order from a lower band number upward (from a lower frequency upward).

The projectors 5a, 5b, and 5c on the receiving side have each a fixed receive frequency or a fixed receive frequency band (that is, a receiving channel). Therefore, each of the channels CH#1, CH#2, and CH#3 has a one-to-one relation with each of the video data #1, #2, and #3 respectively output from the buffers 21a, 21b, and 21c, and the relation is fixed.

In the example of FIG. 12, the channel CH#1 corresponds to the transmitter TX#1, the channel CH#2 corresponds to the transmitter TX#2, and the channel CH#3 corresponds to the transmitter TX#3 in the pattern PT#1. In the pattern PT#2, the corresponding relations in the pattern PT#1 are shifted by one, so that the channel CH#1 corresponds to the transmitter TX#3, the channel CH#2 corresponds to the transmitter TX#1, and the channel CH#3 corresponds to the transmitter TX#2. In the pattern PT#3, the corresponding relations in the pattern PT#1 are further shifted by one, so that the channel CH#1 corresponds to the transmitter TX#2, the channel CH#2 corresponds to the transmitter TX#3, and the channel CH#3 corresponds to the transmitter TX#1.

Upon receiving the timing signal from the timing detector 30, the controller 31 acquires a pattern PT#n from the selection control table, and obtains corresponding relations between the transmitters TX#1 to TX#3 and the channels CH#1 to CH#3 indicated in the pattern PT#n. Then, the controller 31 supplies the information indicating the obtained corresponding relations between the transmitters TX#1 to TX#3 and the channels CH#1 to CH#3 as the switching control signal to the selector 22.

According to the switching control signal and the transmission channel CH information appended to the video data #1, #2, and #3, the selector 22 selects paths between the buffers 21a, 21b, and 21c and the transmitters 23a (TX#1), 23b (TX#2), and 23c (TX#3) so as to supply each of the video data #1, #2, and #3 to each of the transmitters 23a, 23b, and 23c corresponding to each of the channels CH#1, CH#2, and CH#3.

As an example, according to the switching control signal and the transmission channel CH information appended to the video data #1, #2, and #3, the selector 22 selects a path so as to supply the video data #1 corresponding to the channel CH#1, for example, to the transmitter 23a that is matched to the channel CH#1 by the switching control signal.

The controller 31 acquires the pattern PT#n from the selection control table in a sequential and cyclical manner each time it receives the timing signal from the timing detector 30. Then, based on the corresponding relations between the transmitters TX#1 to TX#3 and the channels CH#1 to CH#3 obtained from the acquired pattern PT#n, the controller 31 supplies the switching control signal to the selector 22.

Although the description above has explained that the selection control table stores a plurality of such patterns PT#n, the present embodiment is not limited to this example. For example, the selection control table may store only one pattern PT. In this case, it is conceivable that the controller 31 cyclically shifts the corresponding relations between the channels CH#1 to CH#3 and the transmitters TX#1 to TX#3 in the pattern PT at every timing signal.

A method is also conceivable in which the selection control table is not used. For example, in accordance with the switching control signal supplied from the controller 31 at every timing signal, the selector 22 cyclically switches the connections between the buffers 21a, 21b, and 21c and the transmitters 23a, 23b, and 23c. In the same manner, each of the transmitters 23a, 23b, and 23c cyclically switches each of the transmission channels in accordance with the channel switching signal CH supplied from the controller 31 at every timing signal.

Moreover, although the description above has explained that the pattern PT#n acquired from the selection control table is sequentially switched, the present embodiment is not limited to this example. For example, the pattern PT#n may be selected at random at every timing signal.

Furthermore, although the description above has explained that the controller 31 switches the pattern PT#n at intervals of one video frame, the present embodiment is not limited to this example. Specifically, the pattern PT#n may be switched at intervals of a plurality of frames, such as at intervals of two frames or three frames. It is further possible to switch the pattern PT#n in units smaller than video frames, such as in units of lines or communication packets.

In this manner, according to the second embodiment, the transmission is performed while the pairs between the transmitters 23a to 23c and the projectors 5a to 5c are switched in synchronization with the frame timing, and thereby, the transmission channels to the projectors 5a to 5c can be changed at intervals of the frame timing. As a result, the physical positions of the antenna radiation can be moved, and thus, the propagation paths of electromagnetic waves can be changed. Accordingly, even if the transmission channels between the transmitters 23a to 23c and the projectors 5a to 5c include a low-quality transmission channel, degradation of image quality is less noticeable because signals transmitted via the transmission channel are not received by a fixed projector.

Also, in the second embodiment, the WiMedia system is applied as the communication system. Therefore, it is possible to obtain advantages such as high-speed communication and low power consumption which are features of the WiMedia system, and also to suppress development cost and equipment cost.

Third Embodiment

Figure 13:
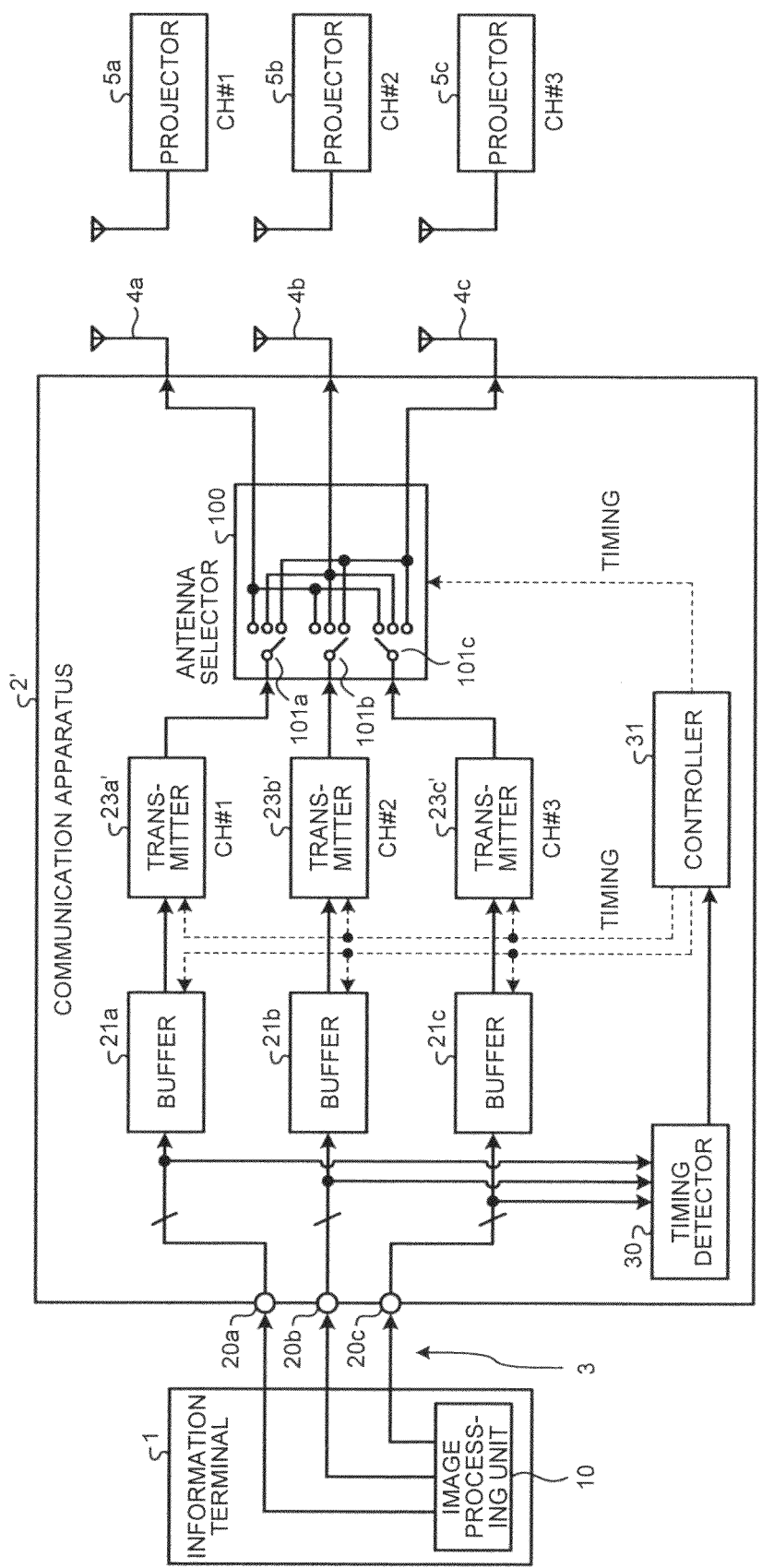
FIG. 13 is a block diagram illustrating a configuration of an example of a communication apparatus applicable to a third embodiment.

Next, a third embodiment of the present invention will be described. FIG. 13 illustrates a configuration of an example of a communication apparatus 2' according to the third embodiment. Note that, in FIG. 13, the same numerals are given to the parts in common with those in FIG. 8 described above, and detailed description thereof will be omitted. The communication apparatus 2' illustrated in FIG. 13 includes the buffers 21a, 21b, and 21c, transmitters 23a', 23b', and 23c', the timing detector 30, the controller 31, an antenna selector 100, and the antennae 4a, 4b, and 4c.

In the second embodiment described above, the connection between each of the transmitters 23a, 23b, and 23c and each of the antennae 4a, 4b, and 4c is fixed, and each of the transmitters 23a, 23b, and 23c switches the frequency of the transmission signal according to the switching of the connected transmission channel by the selector 22. Unlike the second embodiment, in the third embodiment, as illustrated in FIG. 13, the connection between each of the buffers 21a, 21b, and 21c, that is, each of the channels CH#1, CH#2, and CH#3, and each of the transmitters 23a', 23b', and 23c' is fixed, and the antenna selector 100 switches the connections of the antennae 4a, 4b, and 4c to the transmitters 23a', 23b', and 23c'.

As illustrated in FIG. 13, the antenna selector 100 includes switches 101a, 101b, and 101c, each of which has three selection output ends that are switched according to the switching control signal from the controller 31. The three selection output ends of each of the switches 101a, 101b, and 101c are connected to the antennae 4a, 4b, and 4c.

The buffers 21a, 21b, and 21c corresponding to the channels CH#1, CH#2, and CH#3, respectively, are connected to the transmitters 23a', 23b', and 23c', respectively, in fixed relations. Accordingly, each of the transmitters 23a', 23b', and 23c' is sufficient to be capable of sending only the transmit frequency of the corresponding transmission channel CH. For example, each of the transmitters 23a', 23b', and 23c' sends a signal having each of the single frequencies $f_a$, $f_b$, and $f_b$, respectively. In the third embodiment, with this configuration, it is also possible to omit the exchange of the transmission channel CH information.

The same configuration as the configuration described using FIGS. 9 and 10 can be applied to the transmitters 23a', 23b', and 23c'. In the third embodiment, in each of the transmitters 23a', 23b', and 23c', the MAC unit 200 illustrated in FIG. 9 and the frequency selector 213 illustrated in FIG. 10 are each supplied with, for example, a channel switching signal CH indicating a fixed transmission channel. The transmit frequency switching function in each of the transmitters 23a', 23b', and 23c' may be omitted.

According to the switching control signal from the controller 31, the antenna selector 100 switches the connections between the transmitters 23a', 23b', and 23c' and the antennae 4a, 4b, and 4c. At this time, in the antenna selector 100, the connections at the switches 101a, 101b, and 101c are controlled so that the antennae 4a, 4b, and 4c are not connected in an overlapping manner to each of the transmitters 23a', 23b', and 23c' according to the switching control signal.

There are three types of combinations in which the three transmitters 23a', 23b', and 23c' are connected to the three antennae 4a, 4b, and 4c without overlap. Accordingly, the controller 31 controls the connections of the switches 101a, 101b, and 101c of the antenna selector 100, for example, in accordance with a selection control table illustrated as an example in FIG. 14. In FIG. 14, transmitters TX#1', TX#2', and TX#3' correspond to the transmitters 23a', 23b', and 23c', respectively. Antennae AN#1, AN#2, and AN#3 correspond to the antennae 4a, 4b, and 4c, respectively.

In the example of FIG. 14, the antenna AN#1 corresponds to the transmitter TX#1', the antenna AN#2 corresponds to the transmitter TX#2', and the antenna AN#3 corresponds to the transmitter TX#3' in the pattern PT#1'. In the pattern PT#2', the corresponding relations in the pattern PT#1' are shifted by one, so that the antenna AN#1 corresponds to the transmitter TX#3', the antenna AN#2 corresponds to the transmitter TX#1', and the antenna AN#3 corresponds to the transmitter TX#2'. In the pattern PT#3', the corresponding relations in the pattern PT#1' are further shifted by one, so that the antenna AN#1 corresponds to the transmitter TX#2', the antenna AN#2 corresponds to the transmitter TX#3', and the antenna AN#3 corresponds to the transmitter TX#1'.

Upon receiving the timing signal from the timing detector 30, the controller 31 outputs the readout control signal to the buffers 21a, 21b, and 21c. According to this readout control signal, the video data #1, #2, and #3 for one frame are read out from the buffers 21a, 21b, and 21c. The video data #1, #2, and #3 read out from the buffers 21a, 21b, and 21c are supplied to the transmitters 23a', 23b', and 23c', respectively.

Upon receiving the timing signal from the timing detector 30, the controller 31 also acquires a pattern PT#n' from the selection control table, and obtains corresponding relations between the transmitters TX#1' to TX#3' and the antennae AN#1 to AN#3 indicated in the pattern PT#n'. Then, the controller 31 supplies the information indicating the obtained corresponding relations between the transmitters TX#1' to TX#3' and the antennae AN#1 to AN#3 as the switching control signal to the antenna selector 100.

According to the switching control signal, the antenna selector 100 controls the switches 101a, 101b, and 101c and selects paths between the transmitters 23a' (TX#1'), 23b' (TX#2'), and 23c' (TX#3') and the antennae 4a (AN#1), 4b (AN#2), and 4c (AN#3).

The controller 31 acquires the pattern PT#n' from the selection control table in a sequential and cyclical manner each time it receives the timing signal from the timing detector 30. Then, based on the corresponding relations between the transmitters TX#1' to TX#3' and the antennae AN#1 to AN#3 obtained from the acquired pattern PT#n', the controller 31 supplies the switching control signal to the antenna selector 100.

Thus, in the same manner as in the first and the second embodiments described above, the method of the third embodiment can also move the physical positions of the antenna radiation, and thus can change the propagation paths of electromagnetic waves.

Although the description above has explained that the selection control table stores therein a plurality of patterns PT#n', the present embodiment is not limited to this example. For example, the selection control table may store therein only one pattern PT'. In this case, it is conceivable that the controller 31 cyclically shifts the corresponding relations between the transmitters TX#1' to TX#3' and the antennae AN#1 to AN#3 in the pattern PT' at every timing signal.

A method is also conceivable in which the selection control table is not used. For example, in accordance with the switching control signal supplied from the controller 31 at every timing signal, the antenna selector 100 cyclically switches the connections between the transmitters 23a', 23b', and 23c' and the antennae 4a, 4b, and 4c.

Moreover, although the description above has explained that the pattern PT#n' acquired from the selection control table is sequentially switched, the present embodiment is not limited to this example. For example, the pattern PT#n' may be selected at random at every timing signal.

Furthermore, although the description above has explained that the controller 31 switches the pattern PT#n' at intervals of one video frame, the present embodiment is not limited to this example. Specifically, the pattern PT#n' may be switched at intervals of a plurality of frames, such as at intervals of two frames or three frames. It is further possible to switch the pattern PT#n' in units smaller than video frames, such as in units of lines or communication packets.

According to the embodiments, an effect is achieved that degradation in quality of communication in a particular receiver can be suppressed when the communication is performed from one communication apparatus to a plurality of such receivers.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus for performing communication of a plurality of pieces of data, the communication apparatus comprising:
   a plurality of communication units configured to perform communication at frequencies different from each other; and
   a selection unit configured to select a physical position of electromagnetic wave radiation for each of the communication units, and switch the physical position to be selected to another one of the physical positions of the communication units at predetermined intervals,
   wherein each of the communication units performs communication while switching between a plurality of frequencies, and the selection unit selects a different frequency from the plurality of frequencies for each of the communication units as a frequency used for the communication, and switches the frequency to be selected to another one of the frequencies at predetermined intervals.

2. The communication apparatus according to claim 1, wherein the selection unit appends information indicating the frequency selected for each of the communication units to data supplied to the corresponding communication unit.

3. The communication apparatus according to claim 1, wherein the pieces of data are associated with the frequencies, respectively, and the selection unit selects the data associated with the selected frequency and supplies the selected data to the corresponding communication unit that performs communication at the selected frequency.

4. The communication apparatus according to claim 1, wherein
the selection unit includes a switching unit configured to switch connections between the communication units and a plurality of antennae, and
the selection unit switches the connections between the communication units and the antennae by using the switching unit to select the physical position of electromagnetic wave radiation for each of the communication units and to switch the physical position to be selected to another one of the physical positions.

5. The communication apparatus according to claim 1, wherein
the communication units perform communication of video data, and
the selection unit switches the physical position to be selected for each frame of the video data.

6. The communication apparatus according to claim 1, wherein the communication units perform communication of video data; and the selection unit switches the frequency to be selected for each frame of the video data.

7. A communication method for performing communication of a plurality of pieces of data, the communication method comprising:
performing, by a plurality of communication units, a plurality of communications at frequencies different from each other;
selecting, by a selection unit, a physical position of electromagnetic wave radiation for each of the communication units that perform the communications;
switching the physical position to be selected to another one of the physical positions of the communication units that perform the communications at predetermined intervals;
performing communication at each of the communication units while switching between a plurality of frequencies;
selecting a different frequency from the plurality of frequencies for each of the communication units as a frequency used for the communications; and
switching the frequency to be selected to another one of the frequencies at predetermined intervals.

\* \* \* \* \*